United States Patent
Wang et al.

(10) Patent No.: US 10,467,313 B2
(45) Date of Patent: Nov. 5, 2019

(54) ONLINE USER SPACE EXPLORATION FOR RECOMMENDATION

(71) Applicant: Yahoo Holdings, Inc., Sunnyvale, CA (US)

(72) Inventors: Liang Wang, Sunnyvale, CA (US); Shengjun Pan, San Jose, CA (US); Kuang-chih Lee, Union City, CA (US); Quan Lu, San Diego, CA (US); Junwei Pan, Sunnyvale, CA (US)

(73) Assignee: Oath Inc., New York, NY (US)

( * ) Notice: Subject to any disclaimer, the term of this patent is extended or adjusted under 35 U.S.C. 154(b) by 366 days.

(21) Appl. No.: 15/459,633

(22) Filed: Mar. 15, 2017

(65) Prior Publication Data

US 2018/0268073 A1     Sep. 20, 2018

(51) Int. Cl.
    *G06F 16/954*     (2019.01)
    *H04L 29/08*     (2006.01)
    *G06N 20/00*     (2019.01)
    *G06F 16/9535*     (2019.01)

(52) U.S. Cl.
    CPC ........ *G06F 16/954* (2019.01); *G06F 16/9535* (2019.01); *G06N 20/00* (2019.01); *H04L 67/02* (2013.01); *H04L 67/22* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 2008/0209320 A1* | 8/2008 | Mawhinney | G06F 16/9535 715/700 |
| 2010/0138370 A1* | 6/2010 | Wu | G06Q 30/02 706/12 |
| 2013/0080447 A1* | 3/2013 | Ramer | G06Q 30/02 707/748 |
| 2014/0278973 A1* | 9/2014 | Lowe | G06Q 30/0255 705/14.53 |

OTHER PUBLICATIONS

Nadav Golbandi et al, "Adaptive Bootstrapping of Recommender Systems Using Decision Trees", ACM 2011, 10 pages.*

* cited by examiner

*Primary Examiner* — Uyen T Le
(74) *Attorney, Agent, or Firm* — Cooper Legal Group, LLC (57) ABSTRACT

To maximize the accuracy and efficiency of predicting users that will enjoy targeted content, a proposed content selection solution looks to combine a first strategy of utilizing selection rules with a second strategy of utilizing machine based learning models. By combining the selection rules-based approach and the machine learning model-based approach, the proposed content selection solution is able to consider and recommend a wider range of users for each available content.

20 Claims, 6 Drawing Sheets

ONLINE USER SPACE EXPLORATION FOR RECOMMENDATION

BACKGROUND

A website publisher strives to present a website that serves its users (e.g., visitors to the website) with a good website experience. One way the website publisher attempts to provide a good website experience to users is to present targeted content to its users. The content may be advertisements, news content, social media content, or online offers for products or experiences offered through an online marketplace. To effectively generate targeted content for its users, website publishers predict the targeted content based on observable user information gathered through the users' interaction on the Internet. The observable user information may include user attributes included in an online user profile of the user, or online website browser history data attributed to the user.

However, with the popularity of online website browsing, the amount of observable user information related to a user's interactions on the Internet has grown immensely. Filtering through the immense amount of observable user information is a difficult task that requires large amounts of computer processing capabilities and time to sort through. The time attributable to analyzing the observable user information to generate a prediction on enjoyable content to a user also takes away from the user's website experience.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

With the increased popularity and use of the Internet, website publishers find themselves competing with each other to present a visitor with a more enjoyable online experience in the hopes of drawing in more visitors to their websites, or other websites within a family of owned and operated (O&O) websites under a website publisher. To help create a more enjoyable user online experience, certain website publishers have developed a strategy of presenting targeted content to users that visit a website publisher's O&O website. The goal of the targeted content is to present users with content predicted to be interesting to users so that users will interact with the targeted content, have a more enjoyable experience on the website, and/or score a successful conversion of the user with the targeted content.

To accomplish better prediction of targeted content for users, website publishers rely on user information obtained for specific users. A user visiting a website may initially be recognized by the website publisher based on identification information such as, for example, a device identification (e.g., IP or MAC address of the computing device accessing the website), an online profile logged into by the user when visiting the website, or a web browser cookie that is stored on the web browser operated by the user when visiting the website. The web browser cookie may be stored on a user device and transmitted to the website, where the website references the web browser cookie to look up the user's online profile, the user's online browsing history, or other online activity attributed to the user by the website publisher. The user online profile may include a user's name, home address, work address, telephone number, age, social media names, and/or other attributes for describing the user. The online browsing history may describe websites visited by the user, online links clicked by the user, length of time on a website by the user, past interaction with targeted content by the user, and/or items or services bought by the user. User interactions with targeted content may include a number of impressions of the targeted content to the user, a number of conversions of the targeted content (e.g., click on targeted content, signing up to a service provided by the targeted content, buying a product or service offered by the targeted content, viewing the targeted content for longer than a predetermined length of time), or a length of time viewing a targeted content.

While access to a large amount of observable user information may offer some benefits when predicting targeted content for users, in some cases much of the observable user information may end up being superfluous information that is ultimately not relevant to predicting effective targeted content for the user. For example, some of the online browsing history may have been collected while another user was interacting with websites under the user's online profile (e.g., login), or the user's profile may include outdated or erroneous attribute information, or the observable user information may be outdated. Further, analyzing all the available observable user information may be a difficult task requiring large amounts of computer processing capabilities, as well as additional time to analyze when the presentation of targeted content to the user should seem seamless to the user upon visiting a website. So this is undesirable as website publishers may need to purchase more computing capabilities which can be expensive (i.e., more capital investments). The increased dead time that results as the user waits for content while the observable user information is being processed also diminishes a user's website experience. Therefore, there is a need to more effectively data filter through which to filter through the available observable user information to produce more accurate and efficient predictions of targeted content that will be enjoyed by the user.

A first strategy involves the use of selection rules that consider a specific targeted content, and filters through the available observable user information to predict a user (or more than one users) that may enjoy the specific targeted content. A predictor is created as a selection rule that selects users predicted to enjoy the specific targeted content based on the analyzed observable user information. For example, a first predictor may describe a first selection rule that states all females between ages sixteen and twenty one will enjoy advertisement content offering a sale at a teen clothing store. The advertisement content may be a standalone offering from the teen clothing store, or part of an advertisement campaign promoted by the teen clothing store. Then users that satisfy the first selection rule may be grouped into a first user set created by the first predictor.

A second strategy involves the use of machine learning techniques that considers a specific targeted content, and filters through the available observable user information to predict a user (or more than one users) that may enjoy the specific targeted content. A machine learning model (e.g., apply support vector machines (SVM), random forest, or factorization machines (FM) on the observable user information) is utilized to create a predictor that predicts a user's probability for interacting with a specific targeted content. The prediction output from the machine learning model may be assigned a score, and the user with the highest score may be selected into a user set. Alternatively, the prediction output from the machine learning model may be assigned a score, and users assigned a score greater than a threshold score value may be selected into a user set. So a machine learning predictor creates a user set of users predicted to interact with the specified targeted content based on a score resulting from machine learning techniques run on the observable user information.

To maximize the accuracy and efficiency of predicting users that will enjoy targeted content, the proposed content selection solution looks to combine the first strategy of utilizing selection rules and the second strategy of utilizing machine based learning models. By combining the selection rules-based approach and the machine learning model-based approach, the proposed content selection solution is able to consider and recommend a wider range of users for each available content. This has been shown to produce better prediction results when selecting targeted content for users, in contrast to recommending multiple contents per user.

The proposed content selection solution also adapts certain known selection strategies (e.g., Multi-Armed Bandit (MAB)) to explore and exploit through the user sets created according to the combined selection rules-based approach and the machine learning model-based approach. As time passes, the proposed content selection solution obtains access to more performance data describing the performance of its historical predictions, and the selection strategy relies on this performance data to improve its own performance of selecting better performing user sets for presenting targeted content.

The proposed content selection solution also generates more elaborate recommendations of users that are sorted into multiple user sets by the predictors. This occurs when a user is selected for multiple user sets because the user satisfies the conditions for more than one predictor. The intersection of such user sets represent the users that are recommended by more than one selection rule or machine learning model.

Figure 1:
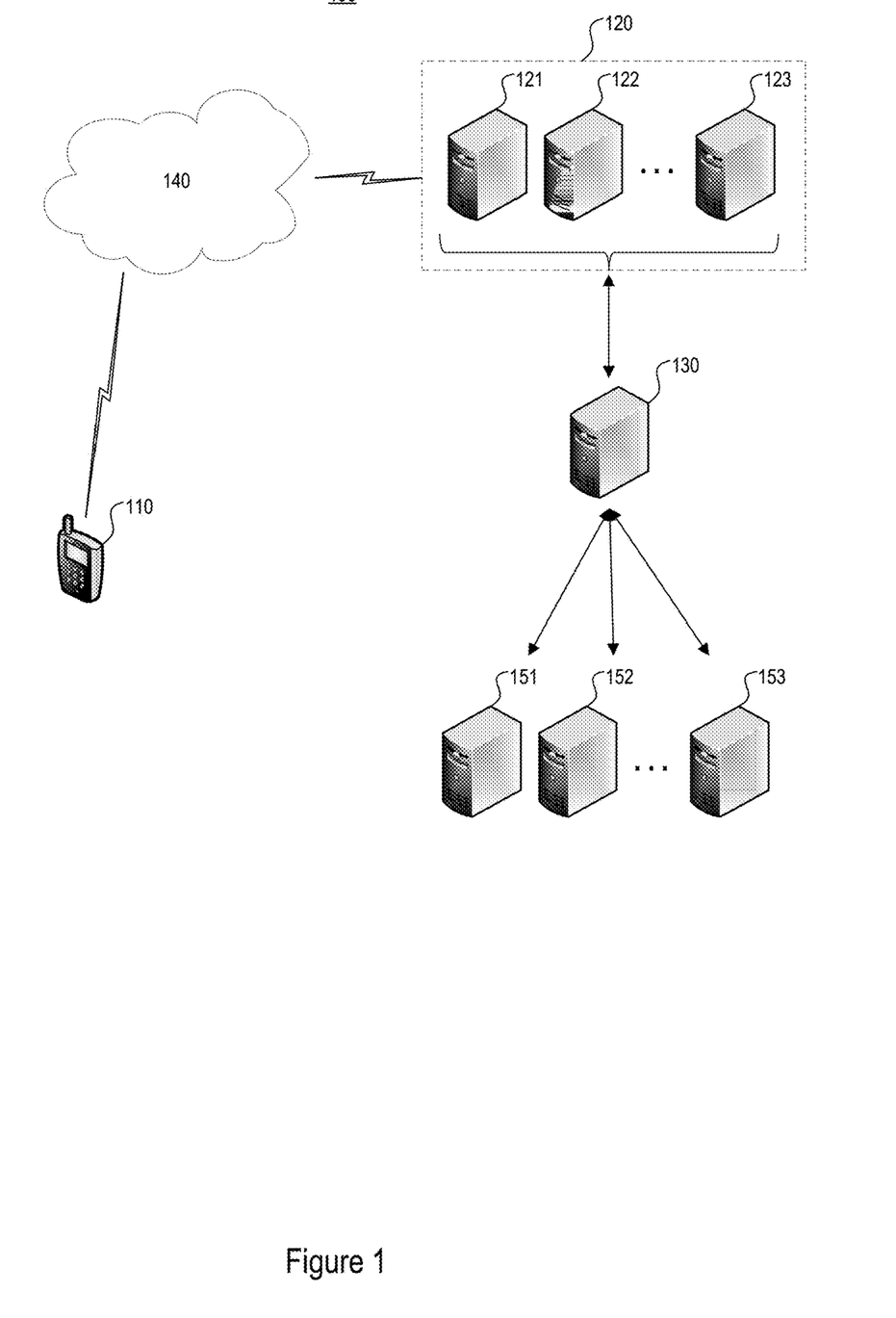
FIG. 1 shows a schematic diagram of an exemplary online system.

FIG. 1 shows an exemplary online system 100 that includes a communication device 110 accessing one or more website servers 121-123 (a first website server 121, a second website server 122, and a third website server 123) through a network 140, where the website servers 121-123 may be part of a family of website servers 120 that are O&O by a common website publisher. A web browser running on the communication device 110 may be operated by a user to access one or more websites hosted by one of the website servers 121-123. A separate website publisher server 130 communicates with the website servers 121-123, where the website publisher server 130 runs a selection tool to predict and select users for targeted content, as described in more detail herein. According to some embodiments, the website publisher server 130 may be included as part of any one of the website servers 121-123, or the website publisher server 130 is otherwise related to the website servers 121-123.

The website publisher server 130 is further in communication with a first content server 151, a second content server 152, and a third content server 153. Each of the first content server 151, the second content server 152, and the third content server 153 may store content considered by the website publisher for presentation to a user visiting a website hosted by the website server 121-123. Each of the first content server 151, the second content server 152, and the third content server 153 may correspond to different content providers such as advertisers, news providers, and online merchants. The content stored by each of the first content server 151, the second content server 152, and the third content server 153 may be singular, or be part of an overall campaign that include one or more related pieces of content. A selection tool running on the website publisher server 130 implements the content selection solution as described in further detail herein to select content from one of the first content server 151, the second content server 152, or the third content server 153 when a user visits a website hosted by one of the website servers 121-123. The selected content may be presented to the user while the user browses the website hosted on one of the website servers 121-123.

Figure 3:
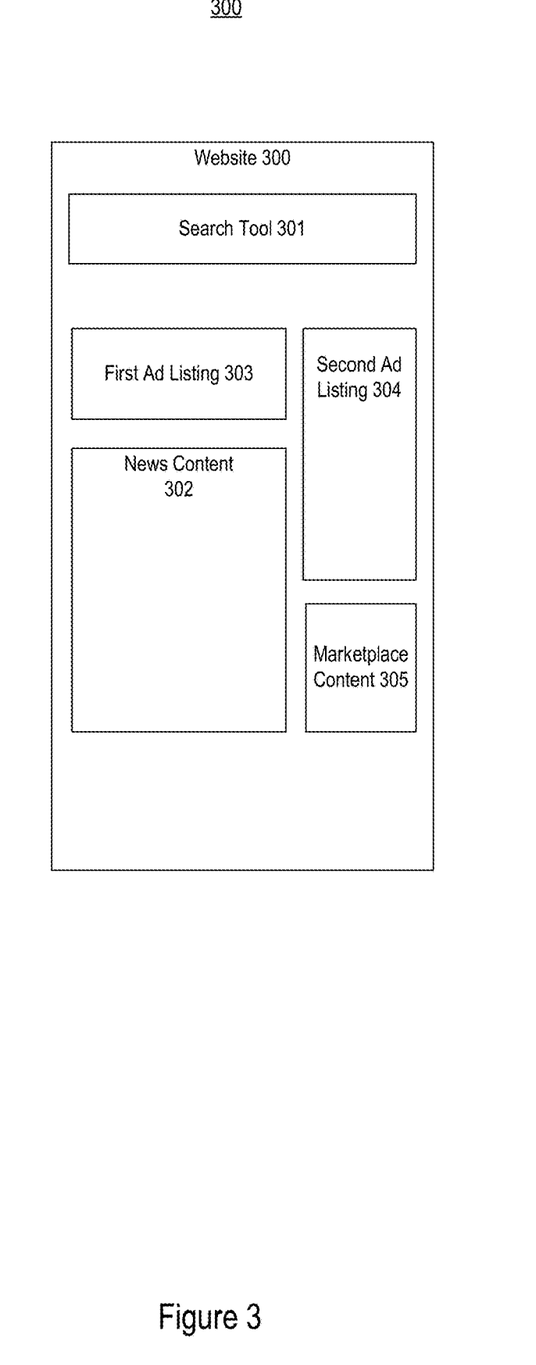
FIG. 3 shows an exemplary website including content presented to a user visiting the website.

To demonstrate the presentation of content to a user visiting a website, FIG. 3 illustrates an exemplary website 300 hosted by, for example, one of the website servers 121-123. The website 300 includes a search tool 301 run by a search engine to return search results to a user input search query. The website 300 further includes content in the form of a first ad listing 303 and a second ad listing 304. Each of the first ad listing 303 and the second ad listing 304 is selected by the selection tool running on the website publisher server 130 based on observable user information obtained by the selection tool that corresponds to the user visiting the website 300. Each of the first ad listing 303 and the second ad listing 304 may further have different attributes to achieve a heterogeneous mix of advertisements within the different ad spaces displayed on the website 300.

The website 300 further includes news content 302, selected by the selection tool based on observable user information obtained by the selection tool that corresponds to the user visiting the website 300. The website 300 further includes marketplace content 305, selected by the selection tool running on the website publisher server 130 based on obtained by the selection tool that corresponds to the user visiting the website 300. The content displayed on the website 300 (the first ad listing 303, the second ad listing 304, the news content 302, the marketplace content 305) may be updated along with search results content that are displayed on the website 300 based on a search result to a search inquiry input to the search tool 301.

Referring back to the online system 100, information shared between the components of the online system 100 is shared through the network 140 (e.g., the Internet). For example, a user operating the communication device 110 may control a web browser application running on the communication device 110 to transmit a viewing request to the first website server 121 for visiting the website hosted by the first website server 121. The website publisher server 130 then monitors and stores the user's online browsing history in a memory or database as the user interacts with the website hosted by the first website server 121. In addition, the website publisher server 130 may receive user attribute information from the website hosted by the first website server 121 as the user inputs the user attribute information during a login or user profile updating feature (e.g., user name, password, address, email address, phone number, and/or other user identifying assistant identifier). The first website server 121, or the website publisher server 130, may receive a web browser cookie from the web browser application, and the first website server 121, or the website publisher server 130, that receives the web browser cookie may reference the web browser cookie to lookup a user profile associated with the user.

Communication device 110 may be a computing device configured to allow a user to connect to the network 140 such as, for example, a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. The communication device 110 may include or may execute a variety of operating systems, including a personal computer operating system, such as a Windows, iOS or Linux, or a mobile operating system, such as iOS, Android, or Windows Mobile, or the like.

Further, the communication device 110 may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. The communication device 110 may also include or execute an application to communicate content, such as, for example, textual content, multimedia content, or the like. The communication device 110 may also include or execute an application to perform a variety of possible tasks, such as browsing, searching, playing various forms of content, including locally stored or streamed video, or games (such as fantasy sports leagues). The communication device 110 includes a communication interface for requesting, accessing, or viewing web-based information made available by, for example, the first website server 121. In addition, the communication device 110 may provide a communication interface for accessing or controlling the first website server 121.

With respect to network 140, network 140 may couple devices so that communications may be exchanged, such as between the first website server 121 and the communication device 110, or other types of devices, including between wireless devices coupled via a wireless network, for example. Network 140 may also include mass storage, such as network attached storage (NAS), a storage area network (SAN), or other forms of computer or machine readable media, for example. Network 140 may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within the larger network 140. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to network 140, such as via a telephone line or link, for example.

Network 140 may include a wireless network configured to couple the communication device 110 with other client devices coupled to the wireless network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, network 140 may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within network 140, or the like.

Signal packets communicated via network 140, which may include a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of network 140, such as, for example, to one or more sites employing a local network address. A signal packet may, for example, be communicated over the Internet from a user site via an access node coupled to the Internet. Likewise, a signal packet may be forwarded via network nodes to a target site coupled to network 140 via a network access node, for example. A signal packet communicated via the Internet may, for example, be routed via a path of gateways, servers, etc. that may route the signal packet in accordance with a target address and availability of a network path to the target address.

Network 140 may also include a "content delivery network" or "content distribution network" (CDN), where the CDN generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Network 140 may also include a peer-to-peer (or P2P) network, where the P2P network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 2:
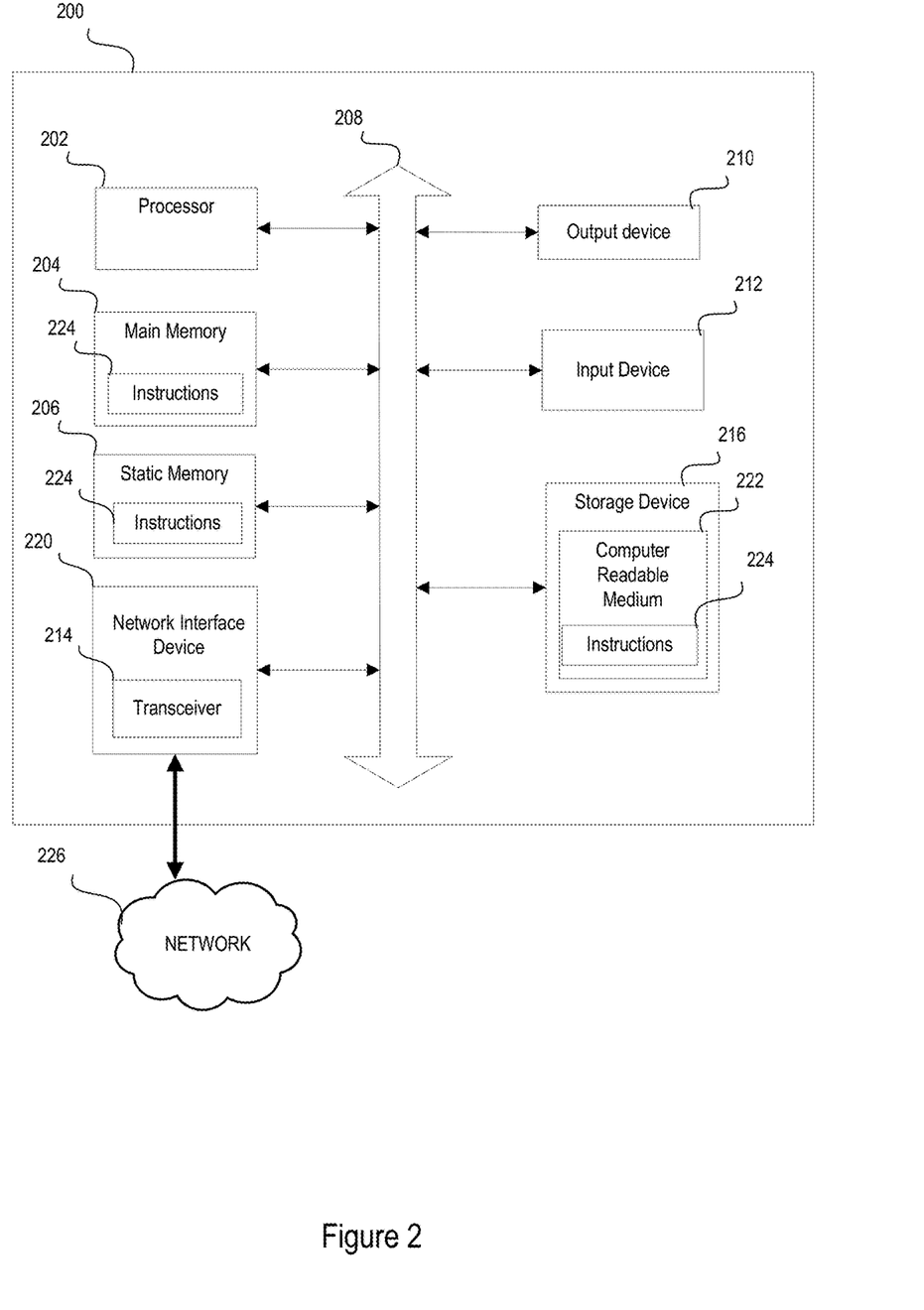
FIG. 2 shows a block diagram of exemplary computer architecture for one or more components included in the exemplary online network illustrated in FIG. 1.

FIG. 2 illustrates exemplary computer architecture for computer 200. Embodiments of computer 200, including embodiments that include additional components and embodiments including fewer components than described, may be representative of any one or more of the devices illustrated in the online system 100 of FIG. 1, such as the communication device 110 or the website publisher server 130.

Computer 200 includes a network interface device 220 that enables communication with other computers via a network 226, where network 226 may represent the network 140 in FIG. 1. The computer 200 may include a processor 202, a main memory 204, a static memory 206, the network interface device 220, an output device 210 (e.g., a display or speaker), an input device 212, and a storage device 216, all connected via a bus 208.

The processor 202 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 202 executes instructions and includes portions of the computer 200 that control the operation of the entire computer 200. The processor 202 may also represent a controller that organizes data and program storage in memory and transfers data and other information between the various parts of the computer 200.

The processor 202 is configured to receive input data and/or user commands from the input device 212. The input device 212 may be a keyboard, mouse or other pointing device, trackball, scroll, button, touchpad, touch screen, keypad, microphone, speech recognition device, video recognition device, or any other appropriate mechanism for the user to input data to the computer 200 and control operation of the computer 200 to implement the features described herein. Although only one input device 212 is shown, in another embodiment any number and type of input devices may be included. For example, input device 212 may include an accelerometer, a gyroscope, and a global positioning system (GPS) transceiver.

The processor 202 may also communicate with other computers via the network 226 to receive instructions 224, where the processor may control the storage of such instructions 224 into any one or more of the main memory 204, such as random access memory (RAM), static memory 206, such as read only memory (ROM), and the storage device 216. The processor 202 may then read and execute the instructions 224 from any one or more of the main memory 204, static memory 206, or storage device 216. The instructions 224 may also be stored onto any one or more of the main memory 204, static memory 206, or storage device 216 through other sources. The instructions 224 may correspond to, for example, instructions that may be executed by the processor 202 to implement the selection tool described herein.

Although computer 200 is shown to contain only a single processor 202 and a single bus 208, the disclosed embodiment applies equally to computers that may have multiple processors and to computers that may have multiple busses with some or all performing different functions in different ways.

The storage device 216 represents one or more mechanisms for storing data. For example, the storage device 216 may include a computer readable medium 222 such as read-only memory (ROM), RAM, non-volatile storage media, optical storage media, flash memory devices, and/or other machine-readable media. In other embodiments, any appropriate type of storage device may be used. Although only one storage device 216 is shown, multiple storage devices and multiple types of storage devices may be present. Further, although the computer 200 is drawn to contain the storage device 216, it may be distributed across other computers, for example on a server.

The storage device 216 may include a controller (not shown) and a computer readable medium 222 having instructions 224 capable of being executed by the processor 202 to carry out processes described herein. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. The storage device 216 may also contain additional software and data (not shown), which is not necessary to understand the features described herein.

Output device 210 is configured to present information to the user. For example, the output device 210 may be a display such as a liquid crystal display (LCD), a gas or plasma-based flat-panel display, or a traditional cathode-ray tube (CRT) display or other well-known type of display in the art of computer hardware. Accordingly, in some embodiments the output device 210 displays a user interface. In other embodiments, the output device 210 may be a speaker configured to output audible information to the user. In still other embodiments, any combination of output devices may be represented by the output device 210.

Network interface device 220 provides the computer 200 with connectivity to the network 226 through any suitable communications protocol. The network interface device 220 sends and/or receives data from the network 226 via a wireless or wired transceiver 214. The transceiver 214 may be a cellular frequency, radio frequency (RF), infrared (IR) or any of a number of known wireless or wired transmission systems capable of communicating with a network 226 or other computer device having some or all of the features of computer 200. Bus 208 may represent one or more busses, e.g., USB, PCI, ISA (Industry Standard Architecture), X-Bus, EISA (Extended Industry Standard Architecture), or any other appropriate bus and/or bridge (also called a bus controller). The network 226 may be a representation of network 140 shown in FIG. 1. Alternatively, network 226 may be another network coupled to, for example, the network 140 shown in FIG. 1.

Computer 200 may be implemented using any suitable hardware and/or software, such as a personal computer or other electronic computing device. In addition to the various types of wearable devices described herein, computer 200 may also be a portable computer, laptop, tablet or notebook computer, PDA, pocket computer, appliance, telephone, or mainframe computer.

Figure 4:
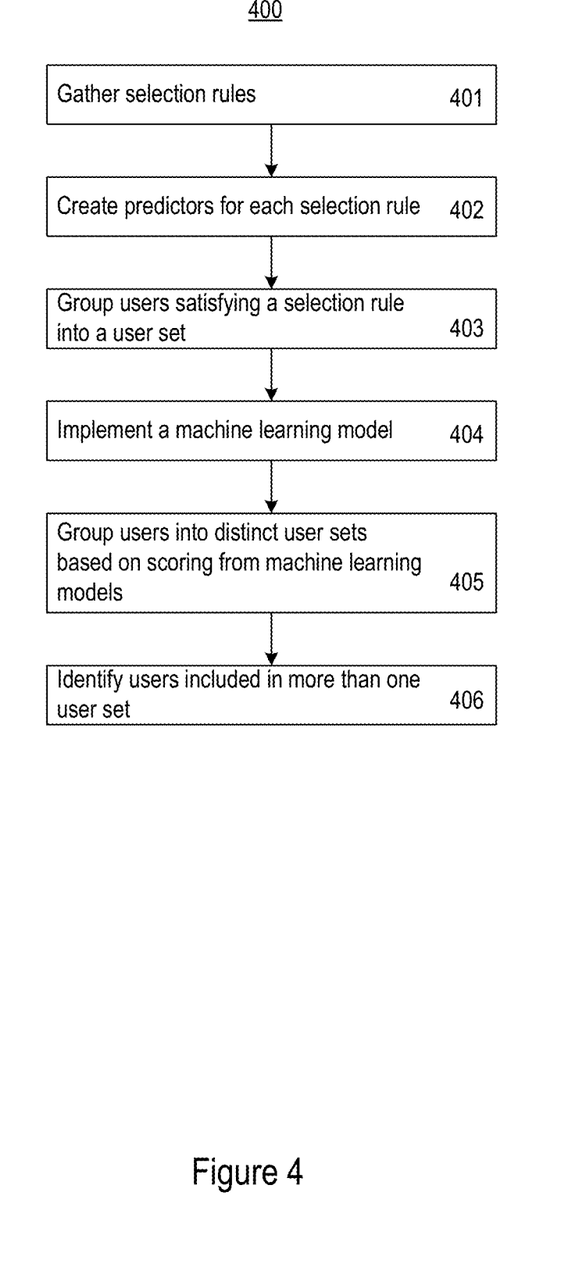
FIG. 4 shows a flow diagram of logic describing a process for creating a user set proposal.

FIG. 4 shows a flow diagram 400 of logic describing a selection strategy process for selecting a user set of online users. The selection strategy process may be implemented by the selection tool running on the website publisher server 130. The overall population of online users considered by the selection tool may include users identified by the website publisher as having visited a website hosted by the family of website servers 120 that are O&O by the website publisher.

For a specific targeted content, selection rules are gathered by the selection tool according to a first strategy (401). The targeted content may be obtained by the selection tool from a content server such as the first content server 151, the second content server 152, or the third content server 153. The selection rules are predetermined rules that identify users predicted to enjoy the targeted content. For example, the content provider may provide predetermined selection rules for the targeted content that predicts types of users that will enjoy the targeted content (e.g., users with age between twenty and thirty, living in California, having clicked on sports related advertisements in recent ten days). The predetermined selection rules may identify conditions that correlate to observable user information such as user attribute information and/or user online browsing history. In addition or alternatively, the predetermined selection rules may be set by the website publisher, content manager, or other offline selection rule generator.

According to the first strategy, the selection tool creates a predictor for each selection rule that embodies the selection rule (402). The predictor is a protocol that operates to identify all users from within the overall user population being considered by the selection tool that satisfy the respective selection rule. A new predictor may be created by the selection tool for one or more of the known selection rules that are gathered by the selection tool.

Then for each predictor that is generated by the selection tool, the users that are identified by the predictor as satisfying the respective selection requirement are grouped into a common user set (403). The grouping of users into user sets may be implemented by the selection tool for each created predictor. In addition or alternatively, the grouping of users into distinct user sets may be implemented by the selection tool for each predictor including a selection rule that predicts selected users will enjoy the targeted content above a predetermined performance threshold level.

In addition to the first strategy involving the creation of predictors based on selection rules, the selection tool further implements a second strategy involving machine learning methods for filtering through available observable user information to predict one or more users that may enjoy the targeted content (404). A machine learning model (e.g., apply support vector machines (SVM), random forest, or factorization machines (FM) on the observable user information) may be utilized to create a predictor that predicts a user's probability for successfully interacting with the targeted content. The prediction output from the machine learning model may be assigned a score that represents a predicted likelihood that the user will successfully interact with the targeted content. A higher score may indicate a higher likelihood the user will successfully interact with the targeted content.

Then for each machine learning model, the users that are identified by the respective predictor as satisfying the scoring requirement are grouped into a common user set (405). For example, user with the highest score may be selected for inclusion into a user set. Alternatively, users assigned a score greater than a threshold score value may be selected for inclusion into a user set.

Figure 5:
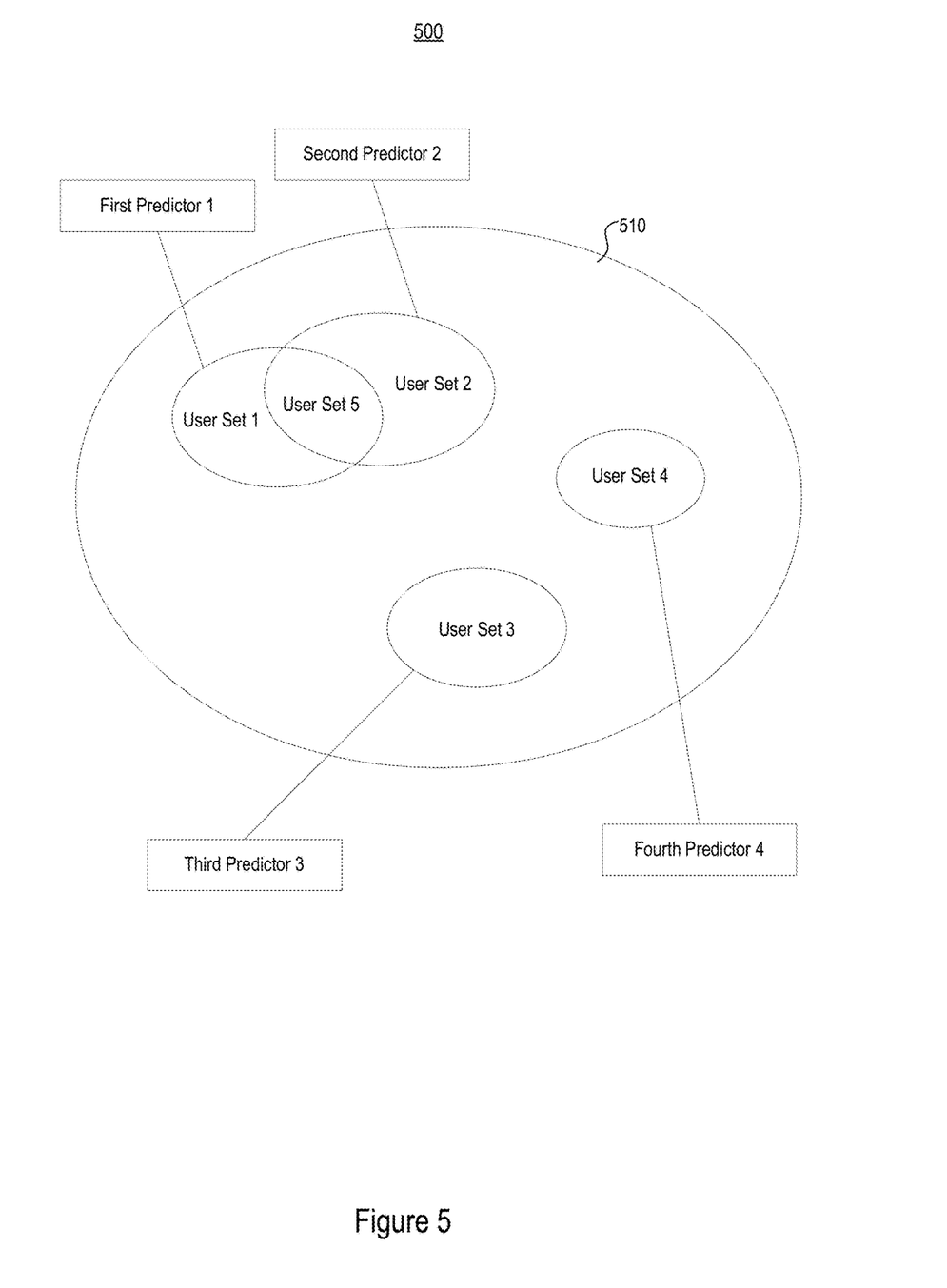
FIG. 5 shows exemplary user sets of online users grouped according to predictors.

The selection tool further identifies users that are grouped into more than one user set (406). For example, FIG. 5 shows an exemplary user set proposal 500 that groups users into user sets according to predictors generated by the selection tool running on, for example, the website publisher server 130. The user set proposal 500 is generated by the selection tool in view of a specific targeted content. The overall population of online users 510 considered by the selection tool may include users identified by the website publisher as having visited a website hosted by the family of website servers 120 that are O&O by the website publisher.

In the user set proposal 500, a first predictor 1 is shown to result in a first user set 1, a second predictor 2 is shown to result in a second user set 2, a third predictor 3 is shown to result in a third user set 3, and a fourth predictor 4 is shown to result in a fourth user set 4. The first predictor 1 and the second predictor 2 may have been created according to the first strategy based on selection rules, while the third predictor 3 and the fourth predictor 4 may have been created according to the second strategy based on machine learning models.

In addition, the selection tool recognizes the intersection of users in both the first user set 1 and the second user set 2. This intersection of users is identified by the selection tool as its own distinct user set 5. Users included in user set 5 are recognized by the selection tool as having a higher probability of enjoying the targeted content. The relative size of the user sets included in the user set proposal 500 may be representative of a relative number of users included in the respective user sets.

Following the selection strategy process shown by flow diagram 400, the selection tool has created a user set proposal, such as user set proposal 500, that identifies proposed users predicted by the selection tool to enjoy the targeted content under both the first strategy based on selection rules and the second strategy based on machine learning models. The selection tool then begins presenting the targeted content to the users, monitors the performance of the targeted content presented to the users, and updates the selection strategy process accordingly.

Figure 6:
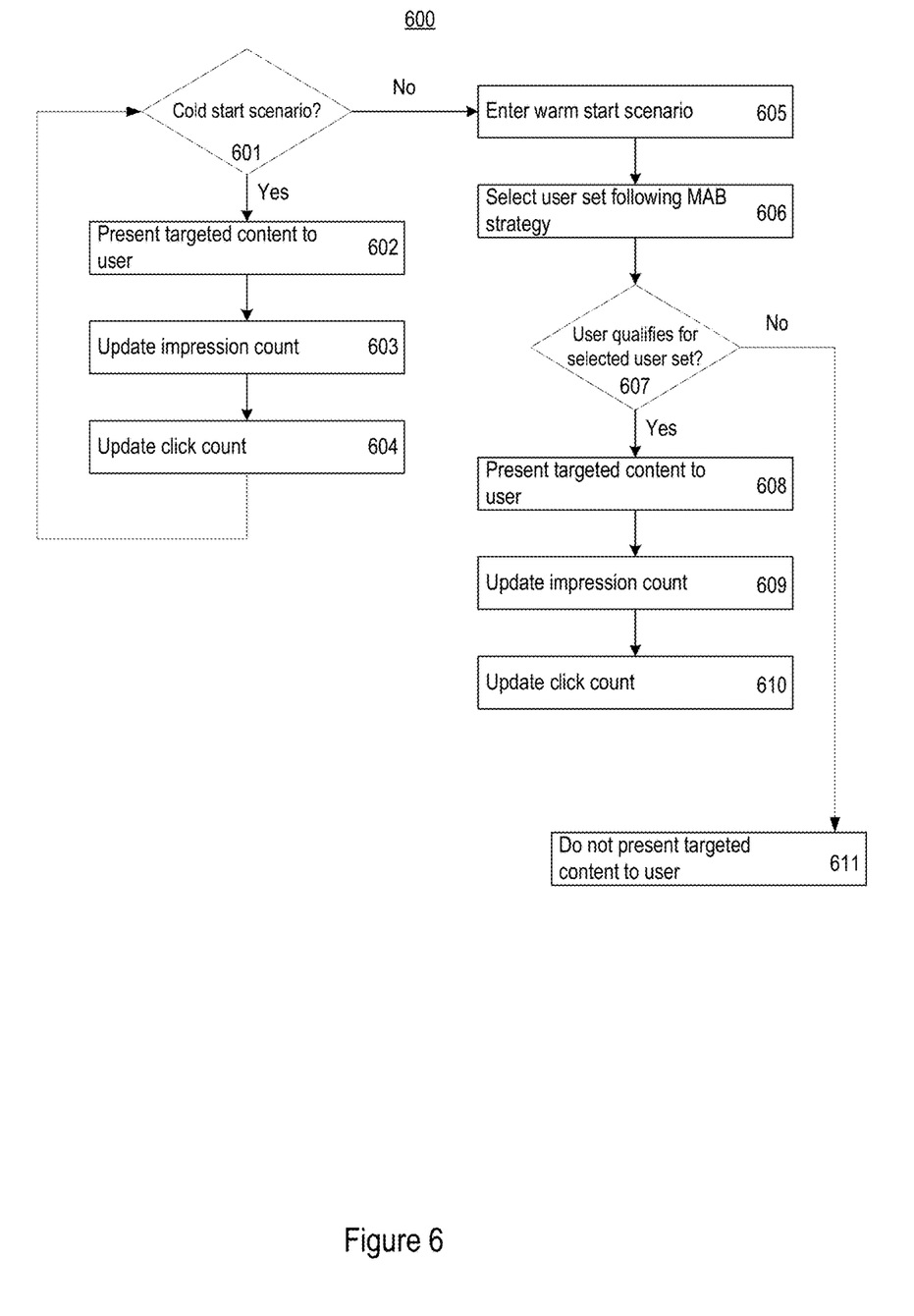
FIG. 6 shows a flow diagram of logic describing a process for selecting a user set of online users according to a selection strategy.

FIG. 6 shows a flow diagram 600 of logic describing a targeted content presentation process. The targeted content presentation process may be implemented by the selection tool running on the website publisher server 130. The selection tool may reference the user set proposal 500 created from the selection strategy process shown by flow diagram 400. The targeted content presentation process monitors a user's reaction to the presentation of targeted content as the user visits and interacts with a website hosted by, for example, a website server from the family of website servers 120.

After detecting the user visiting the website, the selection tool initially determines whether the user is being evaluated in a cold start scenario (601). The cold start scenario is where the selection tool has not yet accumulated sufficient performance data on the user, or group of users (e.g., user sets). The performance data may be represented in the form of an impression count that updates a number of times the targeted content has been presented to the user, where a number of impressions below a predetermined threshold number, Q, indicates a cold start scenario.

When the selection tool determines the user is being evaluated under the cold start scenario, the selection tool will present the targeted content to the user on the website (602). The targeted content may present the targeted content to the user on the website under the cold start scenario without referencing or calculating a prediction on the likelihood the user will enjoy the targeted content, even when such a prediction is available. This is because the number of impressions is low enough where the prediction is not yet considered reliable.

After presenting the targeted content to the user on the website, the selection tool updates an impression count being monitored for the targeted content and the user (603). The impression count monitors a number of times the targeted content has been presented to the user on the website, or in some embodiments, other websites that are O&O by the common website publisher.

After presenting the targeted content to the user on the website, the selection tool monitors the user's interaction with the targeted content to determine whether the user interacts with the targeted content (604). The interactions may be in the form of the user clicking on the targeted content, or otherwise converting on the targeted content. The interaction monitoring may generally be described in a click count updated by the selection tool.

When the impression count is greater than the predetermined threshold number, Q, the selection tool evaluates the user under a warm start scenario (605). The warm start scenario does more than simply present the targeted content to the user regardless of a predicted likelihood the user will enjoy the targeted content, as processed under the cold start scenario.

When the warm start scenario is implemented, the selection tool selects one of the user sets created from the predictors shown in, for example, the user set proposal 500 (606). The selection tool selects the user set according to a known selection strategy for a multi-armed bandit (MAB) problem such as the Thompson Sampling method.

The MAB problem is a known model for studying the exploration vs. exploitation trade-off in sequential decision making. The MAB problem has been presented as a MAB slot machine including a plurality of arms, where each arm has a different probability of resulting in a win, and the basic solution to the MAB problem is to select the arm having the best probability of resulting in a win. Each time an arm is pulled (i.e., played), a random reward is generated according to a fixed, sometimes unknown, distribution between [0, 1] (win is a 1, loss is a 0). The random reward from playing the arm is independent and identically distributed, and independent of the plays of the other arms. The random reward is observed and fed into the fixed distribution for subsequent plays of the arms.

An algorithm representing the MAB problem looks to decide which arm to play for each arm pulling step or time, t, based on the previously recorded t−1 arm pulling outcomes. When $\mu_i$ represents the expected reward for an arm i, the expected total reward in time T may be: $E[\Sigma_{t=1}^{T} \mu_{i(t)}]$, where i(t) is the arm being pulled at time t, and the expectation is over the random choices of i(t). Another representation of the MAB problem is measured as an expected total regret, where the regret is the amount lost because of not playing an optimal arm in each step. The total expected regret in time T is given by: $E[R(T)]=E[\Sigma_{t=1}^{T}(\mu^* - \mu_{i(t)})]$, where $\mu^* = \max_i \mu_i$.

Under the MAB method, each user set from the user set proposal 500 represents an arm within the MAB slot machine, where each pull of an arm on the MAB slot machine is allocated its own unique predicted likelihood the user will enjoy the targeted content. Each impression of the targeted content to the users within the user set proposal 500 is considered a pull of the respective arm, and the corresponding conversion performance (i.e., reward) of the impression may be recorded and used to update the predicted likelihood the user will enjoy the targeted content for each of the user sets. Each time a targeted content is presented to the user on the website and the user clicks or other converts the targeted content, is recorded as a successful win under the MAB method and is assigned a reward value of 1. Each time a targeted content is presented to the user on the website and the user does not click or otherwise convert on the targeted content, is recorded as a loss under the MAB method and is assigned a reward value of 0. For users included in more than one user set, a click or other conversion by the user on a presented targeted content will assign a reward value of 1 for each user set the user belongs to.

Now to select a user set from the user set proposal 500, the selection tool proposes to use the Thompson Sampling method. Referring in terms of the MAB problem, a Thompson Sampling method initially assumes arm i to have a prior Beta(1, 1) on $\mu_i$, where Beta(1, 1) is understood to be the uniform distribution on (0, 1). At time t, having observed $S_i(t)$ successful wins, assuming a reward of 1 for wins, and $F_i(t)$ failures, assuming a reward of 0 for failures, in $k_i(t) = S_i(t) + F_i(t)$ plays of arm i, the Thompson Sampling method updates the distribution on $\mu_i$ as Beta($S_i(t)+1$, $F_i(t)+1$). The Thompson Sampling method then samples from these posterior distributions the $\mu_i$, and plays an arm according to the probability of its mean being the largest. The Thompson Sampling method may be represented by the Thompson Sampling algorithm below, for each arm i=1, . . . , N set Si=0, Fi=0:

```
foreach t = 1, 2, . . . , do
    For each arm i = 1, . . . , N, sample θ_i(t) from the Beta(S_i + 1, F_i + 1)
distribution.
        Play arm i(t) := arg max_i θ_i(t) and observe reward r_t .
        If r = 1, then S_i(t) = S_i(t) + 1, else F_i(t) = F_i(t) + 1.
end
```

Referring back to the flow diagram 600, the Thompson Sampling method may be used by the selection tool to select a user set having the greatest reward values assigned to it from previous impressions of the targeted content on users within the selected user set (606). For each impression of the targeted content on the users in the different user sets in the user set proposal 500, the reward values are assigned according to the MAB method and Thompson Sampling method described herein. Then, for the current selection of a user set, the user set having previously accumulated the most reward value will be selected at (606).

The selection tool then determines whether the user qualifies to be included in the selected user set (607). As described with reference to the user set proposal 500, each user set is created based on a predictor, and each user set includes one or more users that satisfy the conditions described by the respective predictor that created the user set. So the selection tool analyzes the user to determine whether the user qualifies to be included in the selected user set.

When the user is determined to qualify for the selected user set, the targeted content is presented to the user on the website (608). Following the presentation of the targeted content to the user on the website, the selection tool updates an impression count being monitored for the targeted content and the user (609). The impression count monitors a number of times the targeted content has been presented to the user on the website, or in some embodiments, other websites that are O&O by the common website publisher. Following the presentation of the targeted content to the user on the website, the selection tool monitors the user's interaction with the targeted content to determine whether the user interacts with the targeted content (610). The interactions may be in the form of the user clicking on the targeted content, or otherwise converting on the targeted content. The interaction monitoring may generally be described in a click count updated by the selection tool.

When the user is determined not to qualify for the selected user set, the targeted content is withheld from being presented to the user on the website (611).

Because the selection tool combines at least the two different models (the first strategy of utilizing selection rules and the second strategy of utilizing machine based learning models), the selection tool is able to focus on different types of features to offer a more robust sampling of features to consider when predicting which users will enjoy targeted content. This way, the selection tool creates a more elaborate prediction on whether a user will like the targeted content by being able to select from larger pool of prediction models.

The selection tool further leverages the joint regions that are created when users are found to belong to two or more user sets created from two or more predictors that follow two or more strategies. Such joint regions may be referenced by the selection tool to indicate a more high quality of users having a higher probability of enjoying the targeted content for having been selected by more than one strategy.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

It is therefore intended that the foregoing detailed description be regarded as illustrative rather than limiting, and that it be understood that it is the following claims, including all equivalents, that are intended to define the spirit and scope of this disclosure.

What is claimed is:

1. A computing device comprising:
   a communication interface configured to receive user information including user online interaction data;

a memory configured to store a selection rule describing parameters for including one or more users into a user set;
a processor configured to:
receive the user information through the communication interface;
retrieve the selection rule from the memory;
create a first predictor protocol grouping one or more users into a first user set based on the selection rule;
create a second predictor protocol grouping one or more users into a second user set based on a machine learning technique; and
generate a user set proposal including the first user set and the second user set.

2. The computing device of claim 1, wherein the processor is further configured to:
monitor a first performance of a first user included in the first user set interacting with a targeted content, the first performance monitoring a number of conversions of the targeted content by the first user;
monitor a second performance of a second user included in the second user set interacting with the targeted content, the second performance monitoring a number of conversions of the targeted content by the second user;
compare the first performance to the second performance; and
select one of the first user set or the second user set based on the comparison of the first performance and the second performance according to a selection strategy.

3. The computing device of claim 2, wherein a conversion of the targeted content includes either the first user or the second user clicking on the targeted content.

4. The computing device of claim 2, wherein the selection strategy is a multi-armed bandit selection strategy.

5. The computing device of claim 1, wherein the processor is further configured to:
create a third user set comprised of users included in both the first user set and the second user set.

6. The computing device of claim 1, wherein the selection rule selects users within an overall user set that satisfies at least one of a user location requirement, user attribute requirement, or user web browser history requirement.

7. The computing device of claim 1, wherein the first user set and the second user set include users from within an overall user set monitored by a common website publisher.

8. The computing device of claim 1, wherein the machine learning technique outputs a respective conversion score based on conversion of targeted content presented to a user; and
wherein the processor is further configured to select a user to group into the second user set when the user has a conversion score greater than a predetermined threshold value.

9. The computing device of claim 1, wherein the processor is further configured to:
detect a user visiting a website operated by a common website publisher;
determine whether to implement a cold start scenario based on an impression count of a targeted content being greater than a predetermined threshold; and
present the targeted content to the user when determined to implement the cold start scenario.

10. The computing device of claim 9, wherein the processor is further configured to:
implement a warm start scenario when the impression count is less than the predetermined threshold;
select either the first user set or the second user set based on a Thompson Sampling selection strategy;
determine whether the user is included in either the first user set or the second user set; and
present the targeted content to the user when the user is included in the first user set or the second user set.

11. A method comprising:
receiving, by a processor, user information through a communication interface;
retrieving, by the processor, a selection rule stored in a memory;
creating, by the processor, a first predictor protocol grouping one or more users into a first user set based on the selection rule;
creating, by the processor, a second predictor protocol grouping one or more users into a second user set based on a machine learning technique; and
generating, by the processor, a user set proposal including the first user set and the second user set.

12. The method of claim 11, further comprising:
monitoring, by the processor, a first performance of a first user included in the first user set interacting with a targeted content, the first performance monitoring a number of conversions of the targeted content by the first user;
monitoring, by the processor, a second performance of a second user included in the second user set interacting with the targeted content, the second performance monitoring a number of conversions of the targeted content by the second user;
comparing, by the processor, the first performance to the second performance; and
selecting, by the processor, one of the first user set or the second user set based on the comparison of the first performance and the second performance according to a selection strategy.

13. The method of claim 12, converting the targeted content includes either the first user or the second user clicking on the targeted content.

14. The method of claim 12, wherein the selection strategy is a multi-armed bandit selection strategy.

15. The method of claim 11, further comprising:
creating, by the processor, a third user set comprised of users included in both the first user set and the second user set.

16. The method of claim 11, wherein the selection rule selects users within an overall user set that satisfies at least one of a user location requirement, user attribute requirement, or user web browser history requirement.

17. The method of claim 11, wherein the first user set and the second user set include users from within an overall user set monitored by a common website publisher.

18. The method of claim 11, wherein the machine learning technique outputs a respective conversion score based on conversion of targeted content presented to a user; and
wherein the method further comprises selecting a user to group into the second user set when the user has a conversion score greater than a predetermined threshold value.

19. The method of claim 11, further comprising:
detecting, by the processor, a user visiting a website operated by a common website publisher;
determining, by the processor, whether to implement a cold start scenario based on an impression count of a targeted content being greater than a predetermined threshold; and presenting, by the processor, the targeted content to the user when determined to implement the cold start scenario.

20. The method of claim 19, further comprising:

implementing, by the processor, a warm start scenario when the impression count is less than the predetermined threshold;

selecting, by the processor, either the first user set or the second user set based on a Thompson Sampling selection strategy;

determining, by the processor, whether the user is included in either the first user set or the second user set; and presenting, by the processor, the targeted content to the user when the user is included in the first user set or the second user set.

* * * * *